United States Patent
Zhang et al.

(10) Patent No.: US 11,624,121 B2
(45) Date of Patent: Apr. 11, 2023

(54) SOLUTION COMPOSITION AND METHOD FOR SINGLE-BATH POST TREATMENT OF SUBSTRATE

(71) Applicant: United Technologies Corporation, Farmington, CT (US)

(72) Inventors: Weilong Zhang, Glastonbury, CT (US); Michael A. Kryzman, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 408 days.

(21) Appl. No.: 16/791,639

(22) Filed: Feb. 14, 2020

(65) Prior Publication Data
US 2020/0232113 A1 Jul. 23, 2020

Related U.S. Application Data

(62) Division of application No. 15/994,512, filed on May 31, 2018, now Pat. No. 10,563,317, which is a
(Continued)

(51) Int. Cl.
*C25D 9/02* (2006.01)
*C23C 22/40* (2006.01)
(Continued)

(52) U.S. Cl.
CPC .............. *C25D 9/06* (2013.01); *C09D 5/084* (2013.01); *C09K 15/06* (2013.01); *C25D 9/02* (2013.01);
(Continued)

(58) Field of Classification Search
CPC .... C25D 13/06; C25D 9/02–12; C09D 5/084; C09K 15/06
See application file for complete search history.

(56) References Cited

U.S. PATENT DOCUMENTS 5,322,560 A 6/1994 Depue et al.
5,587,059 A 12/1996 Yamoto et al.
(Continued)

FOREIGN PATENT DOCUMENTS

CN 1249365 A 4/2000
CN 1399010 A 2/2003
(Continued)

OTHER PUBLICATIONS

European Examination Report for European Application No. 15173778.0; Application Filing Date: Jun. 25, 2015: dated Sep. 2, 2020; 7 pages.
(Continued)

*Primary Examiner* — Lois L Zheng
(74) *Attorney, Agent, or Firm* — Cantor Colburn LLP

(57) ABSTRACT

Disclosed is a solution composition which may be used for a single-bath electrochemical passivation and a method using the same. The solution composition includes a metal cation, a metal-oxide anion; and an organic ligand, and optionally includes a non-metallic oxide anion or a polymer. The solution composition may prevent undesired precipitation of metal oxides before performing passivation. In addition, the method of passivation using the solution composition in a single-bath use is also provided.

12 Claims, 3 Drawing Sheets

Related U.S. Application Data division of application No. 14/755,916, filed on Jun. 30, 2015, now Pat. No. 10,006,139.

(60) Provisional application No. 62/021,493, filed on Jul. 7, 2014.

(51) Int. Cl.

| | | |
|---|---|---|
| *C25D 9/06* | (2006.01) | |
| *C09K 15/06* | (2006.01) | |
| *C25D 9/08* | (2006.01) | |
| *C25D 13/06* | (2006.01) | |
| *C25D 9/12* | (2006.01) | |
| *C25D 9/10* | (2006.01) | |
| *C25D 9/04* | (2006.01) | |
| *C09D 5/08* | (2006.01) | |

(52) U.S. Cl.
CPC ................ *C25D 9/04* (2013.01); *C25D 9/08* (2013.01); *C25D 9/10* (2013.01); *C25D 9/12* (2013.01); *C25D 13/06* (2013.01)

(56) References Cited

U.S. PATENT DOCUMENTS

| | | |
|---|---|---|
| 5,866,652 A | 2/1999 | Hager et al. |
| 6,582,530 B1 | 6/2003 | Hanlon et al. |
| 10,006,139 B2 | 6/2018 | Zhang et al. |
| 2009/0032144 A1* | 2/2009 | McMillen ............... C23C 22/44 205/189 |
| 2009/0117369 A1 | 5/2009 | Jaworowski et al. |
| 2015/0225856 A1 | 8/2015 | Roth et al. |
| 2016/0002808 A1 | 1/2016 | Zhang et al. |
| 2018/0274119 A1 | 9/2018 | Zhang et al. |

FOREIGN PATENT DOCUMENTS

| | | |
|---|---|---|
| CN | 101665951 A | 3/2010 |
| CN | 102400066 A | 4/2012 |

OTHER PUBLICATIONS

Plakhova, et al. "Solubility of Nanocrystalline Cerium Dioxide: Experiemental Data and Thermodynamic Modeling", J. Phys. Chem. C2016, pp. 22615-22626.
English Abstract for CN101665951A—Mar. 10, 2010; 1 pg.
English Abstract for CN1399010A—Feb. 26, 2003; 1 pg.
European Search Report for Application No. 15173778.0-1359; dated Nov. 10, 2015; 7 pgs.
Lowenheim, F. "Electroplating", 1979, pp. 12-25.
Machine Translation of CN102400066 of Ruidong et al. (2012) 12 pages.
Machine Translation of CN1249365 of Guo et al. (2000) 8 pages.
European Office Action for EP Application No. 15173778.0, dated Nov. 28, 2022, pp. 1-6.

\* cited by examiner

SOLUTION COMPOSITION AND METHOD FOR SINGLE-BATH POST TREATMENT OF SUBSTRATE

CROSS REFERENCE TO RELATED APPLICATIONS

This application is a divisional application of U.S. patent application Ser. No. 15/994,512 filed on May 31, 2018, which is a divisional application of U.S. patent application Ser. No. 14/755,916, filed Jun. 30, 2015, which claims the benefit of U.S. Provisional Application No. 62/021,493 filed Jul. 7, 2014, all of which are incorporated by reference herein in their entirety.

TECHNICAL FIELD

The present invention provides a solution composition which may be used for a single-bath electrochemical passivation and a method using the same.

BACKGROUND

A metal coated substrate, for example, zinc-nickel coated low alloy steel, often requires a post-treatment or a passivation, which may further improve physical properties, such as corrosion resistance, adhesion, property and the like. For example, an aircraft part or an automobile part which is exposed to various environments may be gradually deteriorated due to corrosion, thereby causing damages in the body or the surface. Therefore, high-performance post-treatment may be essential for proper operation or elongation of the life time of such parts.

In the related arts, the post-treatment may be applied as a coating by a standard method, such as spraying and immersing, or by an electrochemical process which includes either cathodic or anodic deposition processes. A protective layer may further be formed on the surface of the coated substrate. Alternatively, the surface of a metallic substrate may be modified by a combination of chemical and electrochemical processes.

Currently, chromate conversion coating has been widely used for passivation treatments on metallic substrates which include aluminum (Al) alloys, or zinc-nickel (Zn—Ni) alloy coated steel. However, due to its toxicity and carcinogen, the use of chromate is highly restricted and, thus, the need for alternative to chromates has increased.

In some efforts, alternative materials may be used instead of chromate as of corrosion inhibitive species. The alternative materials including metal cation, metal oxide, and non-metallic ion, have been used in passivation treatment to provide a protective layer with corrosion resistance; but a chemical reaction between ionic chemical species may occur in electrolyte or an aqueous solution before electrochemical treatment process, thereby producing undesired precipitations.

The description provided above as a related art of the present invention is just for helping understanding the background of the present invention and should not be construed as being included in the related art known by those skilled in the art.

SUMMARY OF THE INVENTION

In one aspect of the present invention, provided is a novel solution composition which may be used in passivation post-treatment of a metal substrate or a coated metal substrate.

In an exemplary embodiment, the solution composition for single-bath passivation may comprise: a metal cation, a metal-oxide anion, and an organic ligand. In particular, the organic ligand forms a complex with the metal cation.

In certain embodiments, the metal cation may be $Ce^{3+}$, $Y^{3+}$, $La^{3+}$, $Pr^{3+}$, $Sm^{3+}$ or mixtures thereof. In another certain embodiments, the metal-oxide anion may be $VO_3^-$, $MoO_4^{2-}$, $WO_4^{2-}$ or mixtures thereof. In yet certain embodiments, the organic ligand may be acetic acid, lactic acid, citric acid, oxalic acid, salicylic acid, tartaric acid, ethylenediaminetetraacetic acid (EDTA), or mixtures thereof.

In an exemplary embodiment, the solution composition for single-bath passivation may comprise: a metal cation, a metal-oxide anion, an organic ligand, and a non-metallic oxide anion. In certain embodiments, the non-metallic oxide anion may be $PO_4^{3-}$, $SiO_3^-$, $B_2O_4^{2-}$ or mixtures thereof. The metal cation, the metal-oxide anion, and the organic ligand may be the same as described above.

In an exemplary embodiment, the solution composition for single-bath passivation may comprise: a metal cation, a metal-oxide anion, an organic ligand, a non-metallic oxide anion, and a polymer. In certain embodiments, the polymer may be polyacrylic acid, polyol, polyethylene glycol, or mixtures thereof. The metal cation, the metal-oxide anion, the organic ligand and the non-metallic oxide anion may be the same as described above.

In certain embodiment, the pH of the solution composition is in a range of about pH 7.0 to about pH 11.0.

In another aspect of the present invention, provided is a method of single-bath passivation post-treatment.

In an exemplary embodiment, the method may comprise: preparing a solution composition, applying the solution composition to a substrate, applying an electric current to the substrate to perform an electrode deposition. Particularly, the solution composition comprises: a metal cation; a metal-oxide anion; an organic ligand; a non-metallic oxide anion; and a polymer.

In an exemplary embodiment, the method may further comprise applying a secondary electric current to the substrate in the solution composition to perform a second electrode deposition.

In certain embodiments, the electric current applied to substrate may be a forward pulse electric current or a reverse pulse electric current. Further, the second electric current applied to substrate may be a forward pulse electric current or a reverse pulse electric current.

In certain embodiments, the metal cation is $Ce^{3+}$, $Y^{3+}$, $La^{3+}$, $Pr^{3+}$, $Sm^{3+}$, or mixtures thereof; the metal-oxide anion may be $VO_3^-$, $MoO_4^{2-}$, $WO_4^{2-}$ or mixtures thereof; the organic ligand may be acetic acid, lactic acid, citric acid, oxalic acid, salicylic acid, tartaric acid, ethylenediaminetetraacetic acid (EDTA), and mixtures thereof; the non-metallic oxide anion may be $PO_4^{3-}$, $SiO_3^-$, $B_2O_4^{2-}$ and mixtures thereof; and the polymer may be polyacrylic acid, polyol, polyethylene glycol, or mixtures thereof.

In certain embodiments, the electric current applied to substrate may be in a range of about 0.06 to 1.0 $mA/cm^2$. Alternatively, an exemplary electric potential may be in a range of about 0.7 to 1.1 V (vs. SCE, Saturated Calomel Electrode). In yet certain embodiments, pH of the solution composition may be in a range of about pH 7.0 to about pH 11.0. In addition, a temperature of the solution composition may be in a range of about 25 to 50° C. In still certain embodiments, the solution composition may be aerated with air or oxygen gas ($O_2$) during the electrode deposition.

Other aspects of the present invention may provide an article manufactured by the method described above.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
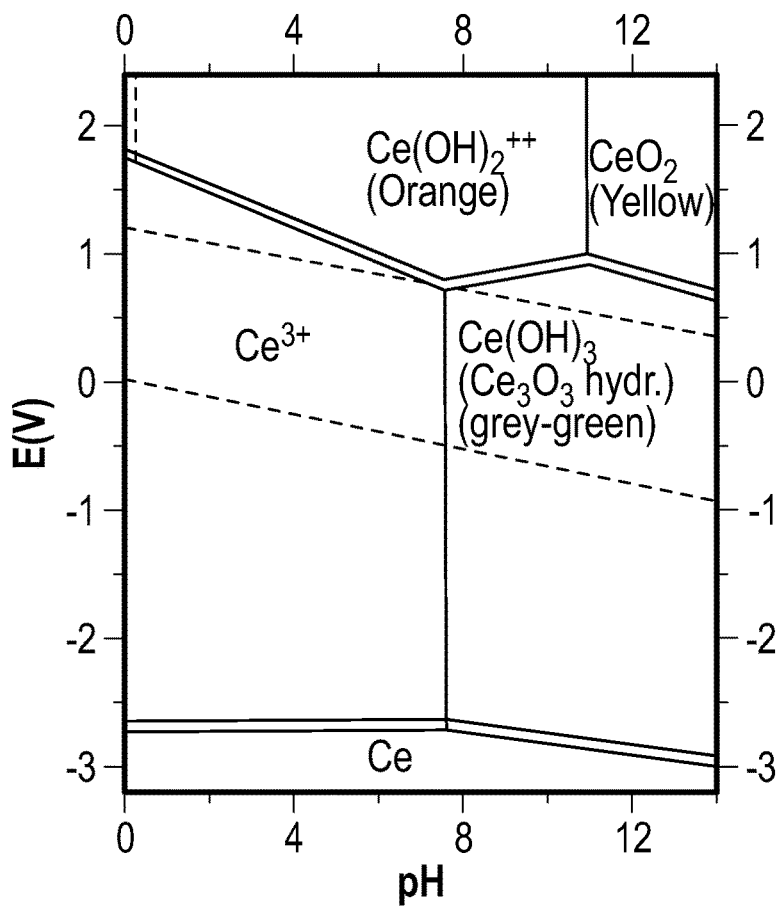
FIG. 1 shows a Pourbaix diagram of cerium (Ce) based on a pH and electric potential changes in an exemplary embodiment of the present invention. For example, as shown in the Pourbaix diagram, CeOx films may be powdery $Ce(OH)_3$ (grey-green) at potential in a range of about −2.5 to 1.0 V(vs. SHE, Standard Hydrogen Electrode)
Figure 2:
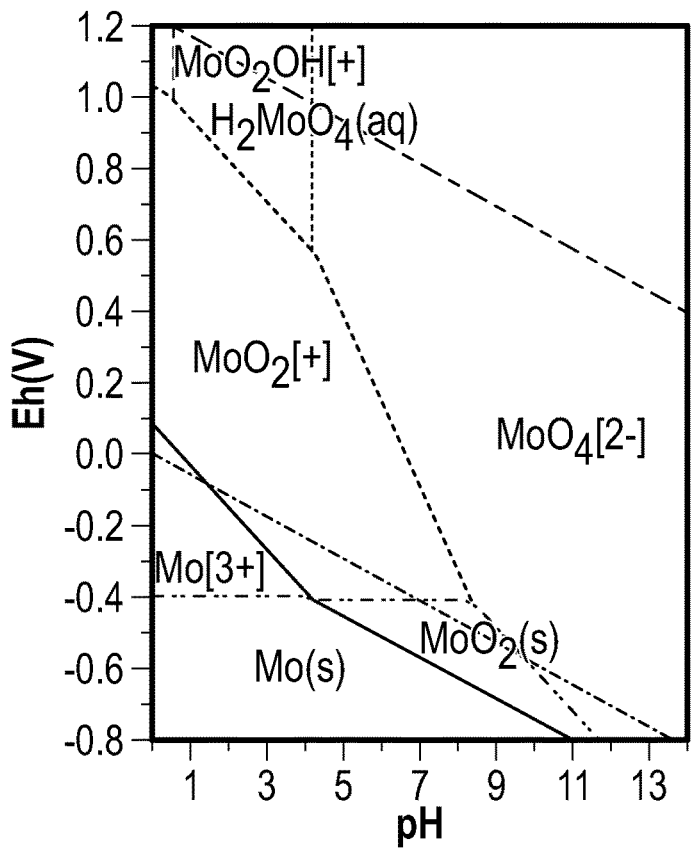
FIG. 2 shows a Pourbaix diagram of molybdenum (Mo) based on a pH and electric potential changes in an exemplary embodiment of the present invention.

The invention has been described in detail with reference to exemplary embodiments thereof. However, it will be appreciated by those skilled in the art that changes or modifications may be made in these embodiments without departing from the principles and spirit of the invention, the scope of which is defined in the appended claims and their equivalents.

Definition

As used herein, the term "passivation" refers to providing a material to the outer surface of a substrate. The passivation may provide a protective material or layer, which may improve physical properties of the surface, for example, corrosion resistance or adhesion. In certain embodiments of the present invention, the passivation may be performed by coating, chemical or electrochemical deposition, or a combination thereof.

As used herein, the term "electrochemical" or "electrochemical process" means a chemical reaction occurs at the interface of an electrode and an electrolyte. The electrode may be a metal or a semiconductor; and the electrolyte may be a solution containing ion, salt and the like. The electrochemical process may involve electron transfer between the electrode and the electrolyte or ionic species in solution. In certain embodiments of the present invention, the electrochemical process may include a reaction, which converts metallic ion or ionic compound into a solid phase, thereby forming a deposition or a precipitation.

As used herein, the term "metal cation" refers to an ionic form of metal having positive charges. The metal cation may be formed in a solution by losing single or multiple electrons to other species in a solution. In certain embodiments of the present invention, the metal cation may be formed from a rare earth metal and a transition metal.

As used herein, the term "metal oxide anion" refers to a negatively charged ionic compound which includes one or more metal atoms and one or more oxygen atoms covalently bonded to the metal. The metal oxide anion may be form a precipitation with a metal cation. In certain embodiments, the metal which makes bonds with oxygen may be a high-valent metal, and may be, but not limited to, a transition metal.

As used herein, the term "organic ligand" refers to an organic molecule which may bind to other species. In certain embodiments, the organic ligand may form a complex with a metal ion or a metal atom by ionic bonding or covalent bonding and may bind to a metal species reversibly or irreversibly. In certain embodiments of the present invention, the organic ligand may be soluble in a solution and form a complex with the metal cation, either rare earth metal ion or transition metal ion.

As used herein, the term "non-metallic oxide anion" refers to a negatively charged ionic compound which includes one or more non-metal atoms and one or more oxygen atoms covalently bonded to the nonmetal. In certain embodiments, the non-metal atom which makes bonds with oxygen may be capable of generating an oxide film.

As used herein, the term "polymer" refers to a high molecular-weight molecule which contains repeating subunits and imparts specific properties to a solution. In certain embodiments of the present invention, the polymer may have a hydrophilic group, hydrophobic group or combined groups, and further may be used a surfactant or a surface modifier.

As used herein, the term "composite" refers to a material which is made from at least two component materials with distinct physical or chemical properties but has different characteristics from the each component, although components are in separated states in the structure and not chemically reacted. In certain embodiments of the present invention, a composite material may be formed with different types of oxide films, i.e. metallic or non-metallic oxide.

As used herein, the term "substrate" refers to an object or an article having a structural part on which a coating or a passivation may be applied. The subject may be formed of a metallic or non-metallic material, and may be coated or non-coated. In certain embodiments of the present invention, the substrate may be a coated substrate, or in particular Zn and/or Zn—Ni alloy coated substrate. In another certain embodiments of the present invention, the material for the substrate may be aluminum alloy or steel. In still another certain embodiment, the substrate may be an aircraft part.

As used herein, "$t_c$" refers to a cathodic time for which a forward pulse electric current is applied.

As used herein, "$t_a$" refers to an anodic time for which a reverse pulse electric current is applied.

As used herein, a cycle refers to a periodic time during which an electric current may be alternatively applied. In certain embodiments, the cycle may include $t_c$, $t_a$ and $t_{off}$.

As used herein, "$t_{off}$" refers to a relaxation time between electric currents.

As used herein, "$i_c$" refers to an electric current or an electric current density when a cathodic (forward) pulse electric current is applied.

As used herein, "$i_a$" refers to an electric current or an electric current density when an anodic (reverse) pulse electric current is applied.

Deposition of Film in Single-Bath

The present invention relates to a passivation post-treatment for coated substrates. In particular, one or more metallic oxide composite films may be deposited on the surface the coated substrate using electrochemical method, for example, cathodic or anodic polarization deposition. Accordingly, the coated substrate may have improved properties, such as corrosion resistance or adhesion.

According to the present invention, the passivation post-treatment may be performed by cathodic deposition process, anodic deposition process or in combination thereof. During the electrochemical deposition, the substrate may be an electrode, such as a cathode and an anode. The electrode may be exposed to an electrolyte, which provides or takes electrons from the electrodes. The electrolyte may be a solution including charged particles, which may react with cathode or anode. Upon applying electric current, exemplary chemical reactions in aqueous solution may occur as below.

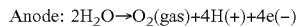

Anode: $2H_2O \rightarrow O_2(gas)+4H(+)+4e(-)$

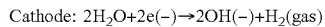

Cathode: $2H_2O+2e(-) \rightarrow 2OH(-)+H_2(gas)$

Afterward, deposition may occur in each electrode and a deposited layer or precipitation may be formed on the surface of the electrodes. Depending on the electrode type, the process may refer to cathodic deposition or anodic deposition. In cathodic deposition, a substrate may be a cathode; and positively charged particles or cations in electrolyte solution may react with hydroxyl ion ($OH^-$) at or near cathode and be deposited on the surface of the cathode, when electric current is applied. For example, $Ce^{3+}$ may be deposited on the surface of cathode by forming cerium oxide film ($CeO_x$ film) based on the condition indicated in Pourbaix diagram of cerium as shown in FIG. 1. In anodic deposition, a substrate may be an anode; and negatively charged particles or anions may react with protons ($H^+$) at or near anode and be deposited on the surface of the anode, when electric current is applied. For example, $MoO_4^{-2}$ may be deposited on the surface of anode by forming molybdenium oxide film ($MoO_x$).

However, prior to the present invention, cathodic and anodic deposition have not been performed in a solution including both positively and negatively charged particles, for example, metal cations and metal-oxide anions, because precipitation may be formed spontaneously even before passivation process or applying electric current. For example, when free Ce (III) ion, i.e. $Ce^{3+}$, is combined with a molybdate ($MoO_4^{2-}$) ion in an aqueous solution, $Ce_2(MoO_4)_3$ precipitations may be spontaneously formed.

In addition, certain type of metal cation may form a hydroxide precipitation in the solution under a specific condition. For example, when a solution containing Ce (III) ion or ($Ce^{3+}$) is in pH of about 8-12, at potential of about −2.5 to 1 V (vs. SHE), a powder form of $Ce(OH)_3$ may be formed by precipitation. In FIG. 1, the Pourbaix diagram shows oxidation state of cerium species based on pH and potential.

Accordingly, in one aspect of the present invention, a solution or an aqueous mixture composition which may prevent such undesired precipitation is provided. The solution may include cationic or anionic particles which are deposited on the electrode during passivation, and organic ligand molecules which prevent spontaneous precipitation of the particles. In particular, the organic ligand molecule may form a complex or chelates with the metal cation and further prevent precipitation.

Figure 3:
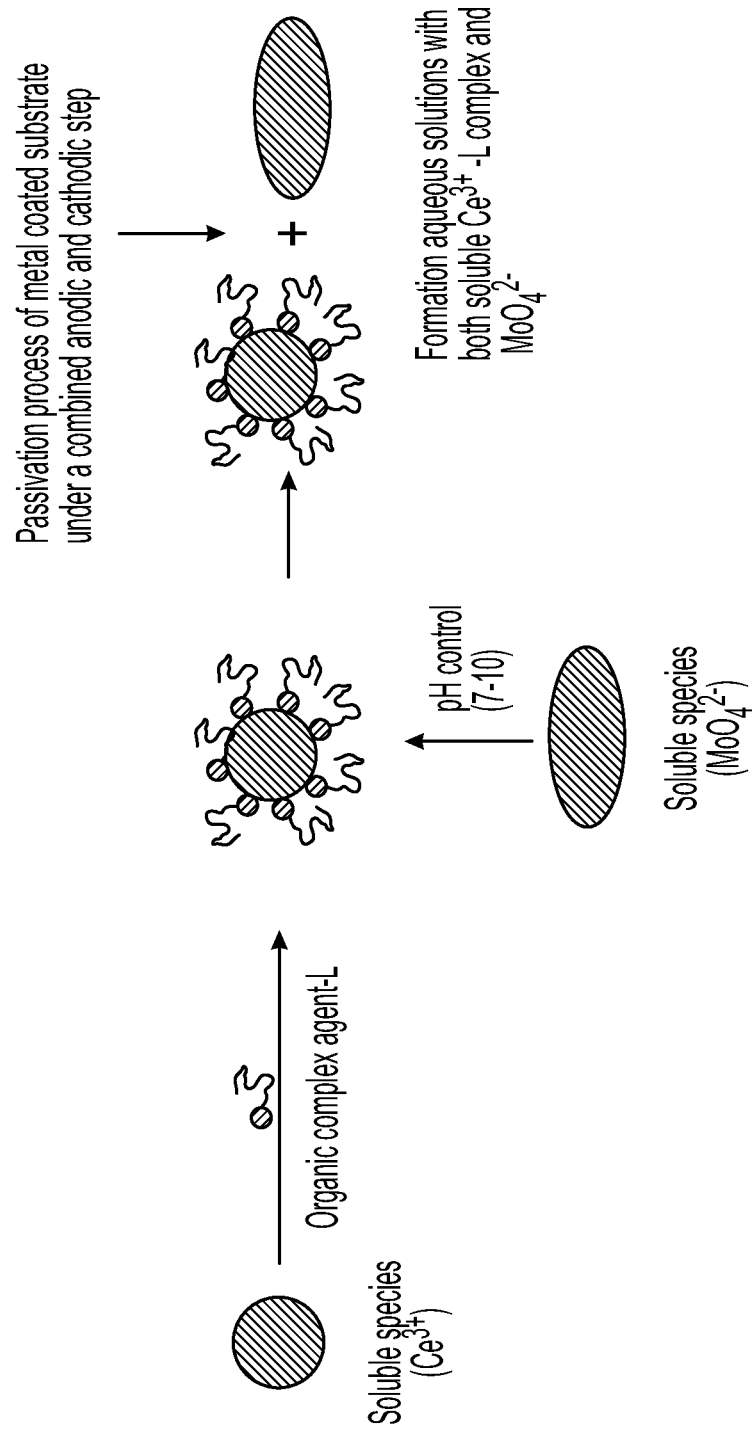
FIG. 3 illustrates soluble species in an aqueous solution according to an exemplary embodiment of the present invention. In an exemplary solution composition, free soluble metal ion ($Ce^{3+}$) may form a complex with organic complex agent (L); and a metal-oxide anion ($MoO_4^{2-}$) may exist as soluble species under pH in a range of about 7 to 10. Therefore, both soluble species, such as $Ce^{3+}$-L and $MoO_4^{2-}$ may be used for passivation process in a single-bath solution in without precipitation or chemical reaction.

In an exemplary embodiment, a metal cation species, metallic-oxide anion species, and organic ligand molecule may be included in the aqueous solution. As shown in FIG. 3, when pH is controlled in a range of about 7 to about 10, both metal-ligand complex ($Ce^{3+}$-L) and metal oxide anions ($MoO_4^{2-}$) remain as soluble species according to an exemplary embodiment of the present invention.

The deposition and formation of metal oxide film may substantially relate to the concentration of free metal ion released from the formed metal-organic ligand complex. In particular, selection of organic ligand as complexing agent may be critical to deposition, because concentration of free metal ion may depend on complex constants in the solution containing the organic ligand. In Table 1, complex constants of exemplary metal cations, $Ce^{3+}$ and $Pr^{3+}$, are listed with exemplary organic ligands.

TABLE 1

Cerium(III) and Praseodymium (III)-ligand complex constants

| Ligands Log K | Acetate | Salicylic acid | Lactic acid | Citrate | Oxalate | EDTA | Tartaric acid |
|---|---|---|---|---|---|---|---|
| Ce(III)-L | 1.68 | 2.66 | 2.76 | N/A | 6.52 | 16.80 | 3.96 |
| Pr(III)-L | 2.69 | | | 5.39 | | | |
| | | | | 5.43 | | | 4.04 |

In certain embodiments, the metal cation may be used in combination, such as $Ce^{3+}$ and $Pr^{3+}$, and the organic ligand may be used in combination, such as acetate and tartaric acid. Since ligand binding constant, pKa of the ligand, pH of free metal cation, or galvanostatic or potentiostatic properties may vary among metal cation species, combined use may provide a composite oxide film, thereby reinforcing corrosion resistance.

In certain embodiments, the solution may further include a non-metallic anion which may form an oxide film on the surface of the substrate. The non-metallic anion may be incorporated into the composite metallic oxide film and may provide improved corrosion resistance. For example, $SiO_3^-$ may be included in the solution containing $Ce^{3+}$, $Pr^{3+}$ and $MoO_4^{2-}$ and thereby, may form a Ce/Pr/Mo/Si oxide composite film by electrochemical deposition.

In certain embodiments, the solution may further include a polymer or surfactant, which may modify the surface of metal cation or metal-oxide ion. In certain embodiments, polymer in the solution may include a hydrophilic group, a hydrophilic group or a combination thereof. The polymer may stabilize the metal cation-organic ligand complex in aqueous environment or be used as surfactant or surface modifier. In addition, the polymer may provide a fine-tuned to the nucleation and growth of Ce/Pr/Mo/Si oxide composite films.

In certain embodiments, the passivation or deposition may vary based on pH or temperature of the solution, aeration, pulse waveform, electric current, cycle time of electric current and the like. In particular, pH of aqueous solution may be critical to both metal-ligand complex ($Ce^{3+}$ and L) and metal oxide anions ($MoO_4^{2-}$) remaining as soluble species. The pH may be in a range of about 5 to 12, of about 5.5 to 11.5, of about 6.0 to 11, of about 6.5 to 10.5, or particularly, of about 7.0 to 10. In certain embodiments, the chemical reaction rate may depend on the solution temperature. The temperature may be maintained in a range of about 0 to 70° C., of about 10 to 60° C., or particularly, of about 25 to 50° C. during deposition. In certain embodiments, an exemplary electric potential may be in a range of about 0.2 to 3.0 V (vs. SCE), of about 0.5 to 2.0 V (vs. SCE), or particularly, of about 0.7 to 1.1 V (vs. SCE). Alternatively, the applied electric current density may be in a range of about 0.01 to 5 mA/cm², of about 0.03 to 3.0 mA/cm², or particularly, of about 0.06 to 1.0 mA/cm². In certain embodiments, the solution may be aerated during passivation. The gas aerated into the solution, may be, but not limited to, air or oxygen ($O_2$). The air or oxygen gas may provide sufficient oxygen sources for oxide formation during passivation.

Figure 4:
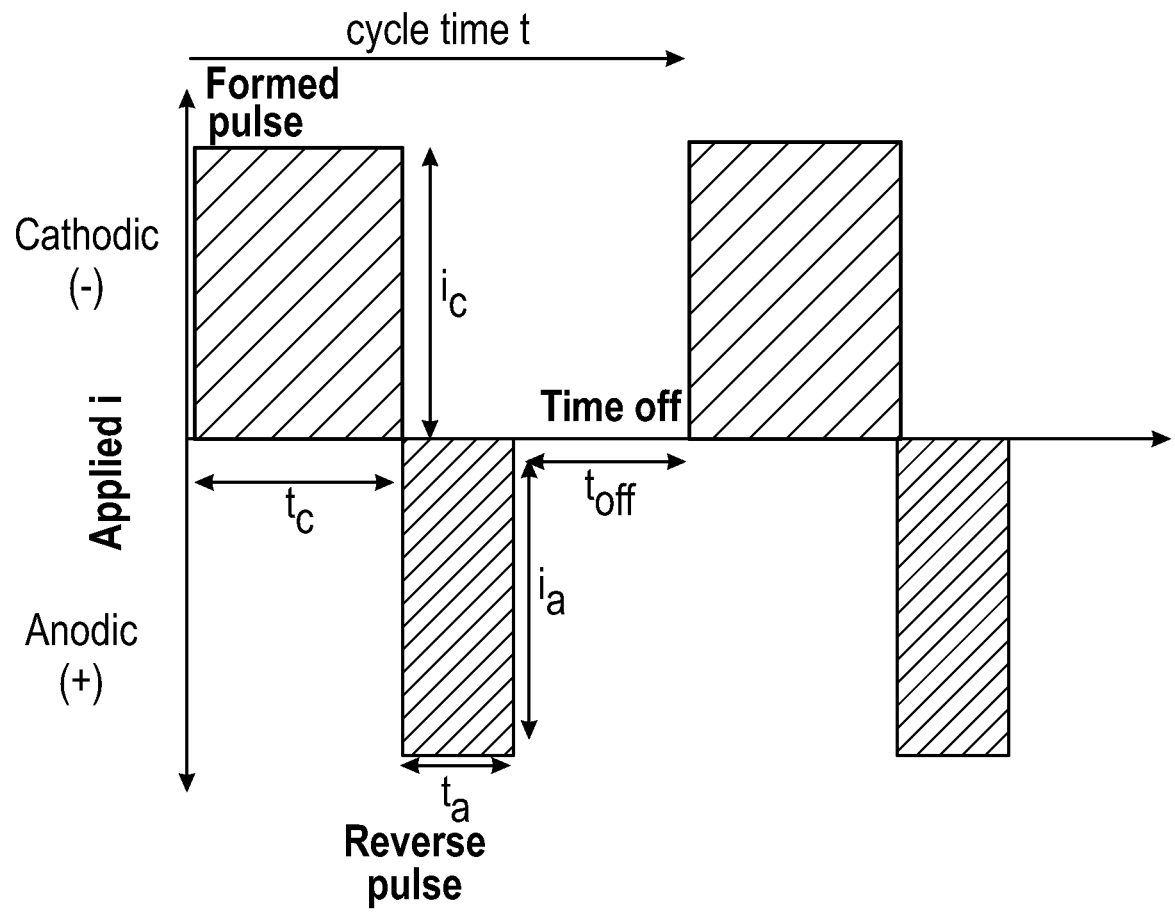
FIG. 4 illustrates an exemplary electrochemical deposition process using forward pulse and reverse pulse techniques according to an exemplary embodiment of the present invention.

In an exemplary embodiment, passivation or deposition may be performed using forward pulse for cathodic deposition and reverse pulse for anodic deposition. In FIG. 4, an exemplary forward pulse and reverse pulse techniques are illustrated with key parameters such as electric current ($i_c$ or $i_a$), cycle time of electric current time ($t_c$, $t_a$, and $t_{off}$), according to an exemplary embodiment of the present invention.

Solution Composition

In one aspect of the present invention, a solution composition which may be used for passivation post-treatment is provided. In particular, the solution composition may be used for a single-bath post-treatment which may be a combined cathodic/anodic deposition process.

In an exemplary embodiment, the solution composition may include: a metal cation, a metal-oxide anion; and an organic ligand. In particular, the metal cation may be a rare earth metal cation or a transitional metal cation. In certain embodiments, metal cation is, but not limited to, $Ce^{3+}$, $Y^{3+}$, $La^{3+}$, $Pr^{3+}$, $Sm^{3+}$ or mixtures thereof. In certain embodiments, the metal oxide anion is, but not limited to, $VO_3^-$, $MoO_4^{2-}$, $WO_4^{2-}$ or mixtures thereof. In certain embodiments, the organic ligand is, but not limited to, acetic acid, lactic acid, citric acid, oxalic acid, salicylic acid, tartaric acid, ethylenediaminetetraacetic acid (EDTA), or mixtures thereof. In particular, the organic ligand may form a complex with the metal cation in the solution.

In an exemplary embodiment, the solution composition may include: a metal cation, a metal-oxide anion; an organic ligand; and a non-metallic oxide anion. The non-metallic oxide anion may be reduced during the anode deposition to form an oxide film on the surface of the anode. In certain embodiments, the non-metallic oxide anion is, but not limited to, $PO_4^{3-}$, $SiO_3^-$, $B_2O_4^{2-}$ or mixtures thereof. The metal cation, the metal oxide anion, and the organic ligand may be included as described above.

In an exemplary embodiment, the solution composition may include: a metal cation, a metal-oxide anion; an organic ligand; a non-metallic oxide anion; and a polymer. In certain embodiments, the polymer is, but not limited to, polyacrylic acid, polyol, polyethylene glycol, or mixtures thereof. The metal cation, the metal oxide anion, the organic ligand and the non-metallic oxide anion may be included as described above.

In an exemplary embodiment, the solution composition may have pH in a range of about 5 to 12, of about 5.5 to 11,5, of about 6.0 to 11, of about 6.5 to 10.5, or particularly, of about 7.0 to 10.

Method of Passivation Post-Treatment

In another aspect of the present invention, a method for single-bath post treatment of substrate using single-bath solution composition above is provided.

In an exemplary embodiment, the method may include: preparing a solution composition; applying the solution composition to a substrate; applying an electric current to the substrate to perform an electrode deposition. The method may further include applying a second electric current to the substrate in the solution composition to perform a second electrode deposition. In certain embodiments, the electric current applied during the electrode deposition may be forward pulse or reverse pulse electric current, without limitation to the order thereof; and the second electric current may also be forward pulse or reverse pulse electric current, without limitation.

In an exemplary embodiment, the method may further include: applying the solution composition to a second substrate; and applying forward pulse or reverse pulse electric current to the second substrate. Further, in another exemplary embodiment, the method may further include performing deposition for additional substrates, without limitation. The substrate may be used as cathode or anode in each deposition process according to the direction of electric current or electric voltage during deposition or the desired oxide film, e.g. $CeO_x$ or $MoO_x$, to be deposited on the substrate, without limitation.

In various exemplary embodiments, the solution used in the method may include: a metal cation, a metal-oxide anion; and an organic ligand, and further include a non-metallic oxide anion or a polymer, as described above in the solution composition. The solution used in each electrode deposition may be used as a single-bath, since the solution includes both positively and negatively charged particles, which may not react or make a precipitate due to the composition of the solution, particularly, organic ligand, and may be subsequently used for each electrodeposition to form a composite oxide film.

In an exemplary embodiment, the substrate may be a coated metal alloy. The coated metal alloy substrate may be, but not limited to, Zn—Ni coated alloy steel, Al alloys, or Mg alloys. Further, the substrate may be an aircraft part. For example, a steel landing gear may be prepared by passivation over zinc coating.

In certain embodiments, the applied electric current density may be in a range of about 0.01 to 5 mA/cm², of about 0.03 to 3.0 mA/cm², or particularly, of about 0.06 to 1.0 mA/cm². Alternatively, an exemplary electric potential may be in a range of about 0.2 to 3.0 V (vs. SCE), of about 0.5 to 2.0 V (vs. SCE), or particularly, of about 0.7 to 1.1 V (vs. SCE). In certain embodiments, the pH of the solution may be in a range of about 5 to 12, of about 5.5 to 11.5, of about 6.0 to 11, of about 6.5 to 10.5, or particularly, of about 7.0 to 10. In certain embodiments, the chemical reaction rate may be depend on the solution temperature, and thus the temperature may be maintained in a range of about 0 to 70° C., of about 10 to 60° C., or particularly, of about 25 to 50° C. during deposition. In certain embodiments, the solution may be aerated during passivation. The gas aerated into the solution, may be, but not limited to, air or oxygen gas ($O_2$).

In an exemplary embodiment, passivation or deposition may be performed using forward pulse for cathodic deposition and reverse pulse for anodic deposition.

In an exemplary embodiment, passivation or deposition may be performed by applying the electric current or electric potential for about 100 ms ($t_c$) and 20 ms ($t_a$), followed by about 40 ms relaxation interval time between them.

EXAMPLE

A solution containing about 0.1 M of cerium ion ($Ce^{3+}$), about 0.1 M of praseodymium ion ($Pr^{3+}$), about 0.11 M of acetic acid, about 0.11 M of tartaric acid, about 0.1 M molybdate ($MoO_4^{2-}$), about 0.1 M of phosphate ($PO_4^{3-}$), about 0.1 M of meta-silicate ($SiO_3^-$), and about 1 to 2 wt % of polyacrylic acid based on the total weight of the solution was prepared. The pH of the prepared solution was adjusted using, for example, sodium hydroxide (NaOH 10 wt %) and the temperature of the solution was maintained at about 25° C. A zinc coated steel substrate which was from a landing gear of an aircraft was provided and immersed in the prepared solution, and a platinum grid as counter electrode. A cathodic (forward) electric pulse was applied to the substrate at $i_c$ of about 1.0 mA/cm² for about 100 ms ($t_c$). Subsequently, an anodic (reverse) electric pulse was applied to the substrate at $i_a$ of about 0.2 mA/cm² for about 20 ms ($t_a$), followed by about 40 ms relaxation time ($t_{off}$) between them. The post-treated substrate was obtained for about 10-15 minutes.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An article manufactured by a method of single-bath passivation post-treatment, comprising:
    preparing a solution composition;
    applying the solution composition to a substrate;
    applying an electric current to the substrate to perform an electrode deposition;
    wherein the solution composition comprises:
        a metal cation selected from the group consisting of $Ce^{3+}$, $Y^{3+}$, $La^{3+}$, $Pr^{3+}$, $Sm^{3+}$, and mixtures thereof;
        a metal-oxide anion selected from the group consisting of $VO_3^-$, $MoO_4^{2-}$, $WO_4^{2-}$, and mixtures thereof;
        an organic ligand selected from the group consisting of acetic acid, lactic acid, citric acid, oxalic acid, salicylic acid, tartaric acid, ethylenediaminetetraacetic acid (EDTA), and mixtures thereof;
        a non-metallic oxide anion selected from the group consisting of $PO_4^{3-}$, $SiO_3^-$, $B_2O_4^{2-}$, and mixtures thereof; and
        a polymer selected from the group consisting of polyacrylic acid, polyol, polyethylene glycol, and mixtures thereof;
    wherein the substrate comprises a first metallic-oxide film formed from the metal cation, and a second metallic-oxide film formed from the metal-oxide anion or a non-metallic-oxide film formed from the non-metallic oxide anion.

2. The article of claim 1, wherein the electric current applied to the substrate is a forward pulse electric current or a reverse pulse electric current.

3. The article of claim 1, wherein the method further comprises applying a secondary electric current to the substrate in the solution composition to perform a second electrode deposition.

4. The article of claim 1, wherein the electric current is 0.06 to 1.0 mA/cm².

5. The article of claim 1, wherein the solution composition has a pH of about 7.0 to about 11.0.

6. The article of claim 1, wherein the solution composition has a temperature of 25 to 50° C.

7. The article of claim 1, wherein the solution composition is aerated with air or oxygen gas during the electrode deposition.

8. The article of claim 1, wherein the substrate is a coated substrate.

9. The article of claim 8, wherein the substrate is coated Zn or coated Zn-Ni alloy.

10. The article of claim 1, wherein the substrate is aluminum or steel.

11. The article of claim 1, wherein the substrate is an aircraft part.

12. The article of claim 1, wherein the substrate comprises the first metallic-oxide film formed from the metal cation, and the second metallic-oxide film formed from the metal-oxide anion, and the non-metallic-oxide film formed from the non-metallic oxide anion.

* * * * *